(12) United States Patent
Goldstein

(10) Patent No.: US 6,802,760 B1
(45) Date of Patent: Oct. 12, 2004

(54) DISK RESTORATION SERVICE VENDING MACHINE

(76) Inventor: Steven G. Goldstein, 13428 Maxella Ave. #254, Marina Del Rey, CA (US) 90292

( * ) Notice: Subject to any disclaimer, the term of this patent is extended or adjusted under 35 U.S.C. 154(b) by 0 days.

(21) Appl. No.: 10/393,502

(22) Filed: Mar. 19, 2003

Related U.S. Application Data

(60) Provisional application No. 60/366,176, filed on Mar. 19, 2002.

(51) Int. Cl.[7] ........................ B24B 49/00; B24B 51/00
(52) U.S. Cl. ............................ 451/5; 451/9; 451/41; 451/60; 451/63; 451/285; 451/287; 451/290
(58) Field of Search ............................ 451/5, 8, 9, 41, 451/60, 63, 285–289

(56) References Cited

U.S. PATENT DOCUMENTS

| | | | | |
|---|---|---|---|---|
| 3,448,855 A | * | 6/1969 | Soderstrom | 209/534 |
| 3,590,992 A | * | 7/1971 | Soderstrom | 209/534 |
| 3,735,533 A | * | 5/1973 | Salberg | 451/152 |
| 5,102,099 A | * | 4/1992 | Brown et al. | 451/283 |
| 5,226,519 A | * | 7/1993 | DeWoolfson | 194/209 |
| 5,601,473 A | * | 2/1997 | Strain et al. | 451/5 |
| 6,261,159 B1 | * | 7/2001 | Krieg et al. | 451/63 |
| 6,322,430 B1 | * | 11/2001 | Kennedy et al. | 451/287 |
| 6,386,946 B1 | * | 5/2002 | Lin et al. | 451/7 |
| 6,726,527 B2 | * | 4/2004 | Lalli et al. | 451/5 |
| 2003/0049996 A1 | * | 3/2003 | Nam | 451/178 |

* cited by examiner

Primary Examiner—M. Rachuba
(74) Attorney, Agent, or Firm—Robert W. J. Usher

(57) ABSTRACT

Vending apparatus for optical disk restoration has a housing for receiving the disk form a customer; a disk inspection device to determine whether the disk is correctly positioned for polishing and providing a signal indicative of disk position, a disk perforation detecting device providing a signal indicative of any perforation in a reflective layer of the disk; and a device for ejecting a perforated disk from the housing. A user interface requests and receives payment from a customer in response to a signal by the detecting device that the reflective layer is imperforate and provides a signal indicating receipt of correct payment. Polishing wheels polish, with slurry, an exposed light receiving surface of a data carrying protective layer of the disk to ameliorate scratches in response to a signal from the user interface of correct payment and a device ejects a polished disk from the housing to a customer.

14 Claims, 8 Drawing Sheets

DISK RESTORATION SERVICE VENDING MACHINE

RELATED APPLICATIONS

Priority is claimed from provisional application Ser. No. 60/366,176, filed Mar. 19, 2002, the disclosure of which is incorporated herein by reference

FIELD OF THE INVENTION

The invention relates to an automatic service vending machine that accepts currency and/or credit or debit cards and restores scuffed or scratched compact disks (optical disks), such as music or software CD's, DVD's, game discs and CD-ROMs (hereinafter referred to as disks).

BACKGROUND OF THE INVENTION

There have been numerous prior attempts at disk restoration by polishing or resurfacing of the polycarbonate layer as exemplified by the teachings of U.S. Pat. 6,322,430 issued Nov. 27, 2001 to Kennedy et al, and U.S. Pat. No. 5,945,566 issued Sep. 21, 1999 to Bauer, the disclosures of which are incorporated herein by reference, but none teach or suggest entirely automatic handling of the disk, nor a vending machine approach.

SUMMARY OF THE INVENTION

According to one aspect, the invention provides disk restoration service vending apparatus comprising means for inspecting a disk to determine whether it is correctly positioned and for detecting scratches/puncture (in the reflective layer) and assessing reparabilty and means for polishing the exposed light receiving protective (polycarbonate) layer of the disk to reduce, ameliorate or eliminate scratches in response to payment by a user.

In one embodiment, a disk transferring means may be provided to transfer the disk between the inspection means and the polishing means.

In another embodiment, the inspection means and the polishing means may be provided at same operating station avoiding disk transfer.

The invention also provides vending apparatus for optical disk restoration comprising: a housing; means for receiving and guiding an optical disk to be restored from a customer into the housing; means for inspecting the disk in the housing to determine whether the disk is correctly positioned for polishing and for providing a signal indicative of a position of the disk; means for detecting any perforation in a reflective layer of a correctly positioned disk and providing a signal indicative thereof; means for ejecting the disk from the housing in response to a signal by the detecting means that the reflective layer has been perforated; a user interface for requesting and receiving payment from a customer in response to a signal by the detecting means that the reflective layer is imperforate and for providing a signal indicating receipt of correct payment; means for polishing an exposed light receiving surface of a data carrying protective layer of the disk to ameliorate any scratches therein in response to receipt of a signal from the user interface means indicating correct payment by the payment requesting and receiving means; and, means for ejecting a polished disk from the housing to the customer.

More specifically, the detecting means and the polishing means are provided at a detecting station and a polishing station, respectively, and means are provided for transferring the disk from the detecting station to the polishing station in response to a signal from the detecting means that the reflective layer is imperforate.

Preferably, the guiding means comprises a disk receiving slot formed in an outer wall of the housing and means are provided for feeding a disk received in the slot to the inspecting station.

In a preferred construction, the detecting station is located vertically above the polishing station and the transferring means comprises a vertical spindle having an upper end provided with disk supporting means and being movable between an upper disk receiving position at the detecting station and a lower disk polishing position at the polishing station.

Conveniently, the spindle forms a hub driving a disk supporting turntable at the polishing station.

It is further preferred that the polishing means comprises: a polishing wheel having a smooth, hard polishing surface; means for supplying, sequentially, a first grade and a second grade of abrasive slurry at a controlled rate to the surface of the polishing wheel, the first grade being coarser than the second grade; and, means maintaining the polishing surface parallel to and spaced apart from the disk surface by an amount sufficient to permit distribution of the abrasive slurry therebetween thereby to polish the disk surface.

This contactless approach significantly reduces wear on the polishing wheel obviating frequent replacement and consequential downtime.

Conveniently, the disk is ejected from the housing through the disk receiving slot.

According to another aspect, the invention provides a method for polishing the surface of an optical disk comprising the steps of: providing a rotating polishing wheel having a smooth, hard polishing surface; supplying, sequentially, a plurality of grades of abrasive slurry of successively increasing fineness at a controlled rate to the polishing surface of the rotating polishing wheel, successive grades being finer than prior grades, while maintaining the polishing surface parallel to and spaced apart from the disk surface during the supply of the slurry by an amount sufficient to permit distribution of the abrasive slurry therebetween, thereby to polish the disk surface.

According to a further aspect, the invention provides apparatus for polishing the surface of an optical disk comprising: a rotating polishing wheel having a smooth, hard polishing surface; means for supplying, sequentially, a plurality of grades of abrasive slurry of successively increasing fineness at a controlled rate to the polishing surface of the rotating polishing wheel, means for maintaining the polishing surface and a surface of a disk to be polished parallel to and relatively spaced apart; during the supply of the slurry by an amount sufficient to permit distribution of the abrasive slurry therebetween, thereby to polish the disk surface.

The invention also provides an automated method for restoring optical disks in return for payment by a customer comprising the steps of: providing a housing; receiving in the housing a disk to be restored from a customer; checking that the disk is correctly positioned in the housing for polishing; one of ejecting the disk from the housing if the disk is incorrectly positioned for polishing and, if correctly positioned, inspecting the disk for any perforation in a reflective layer of the disk; one of ejecting the disk from the housing if the reflective layer is perforated and, if imperforate, requesting payment from the customer; one of ejecting the disk from the housing if correct payment is not received and, if correct payment received, restoring the disk by polishing; and ejecting the restored disk from the housing.

BRIEF DESCRIPTION OF THE DRAWINGS

In order that the invention may be readily understood, embodiments of disk restoration service vending machines according to the invention will now be described by way of example only with reference to the accompanying drawings in which.

DESCRIPTION OF PARTICULAR EMBODIMENT

Figure 1:
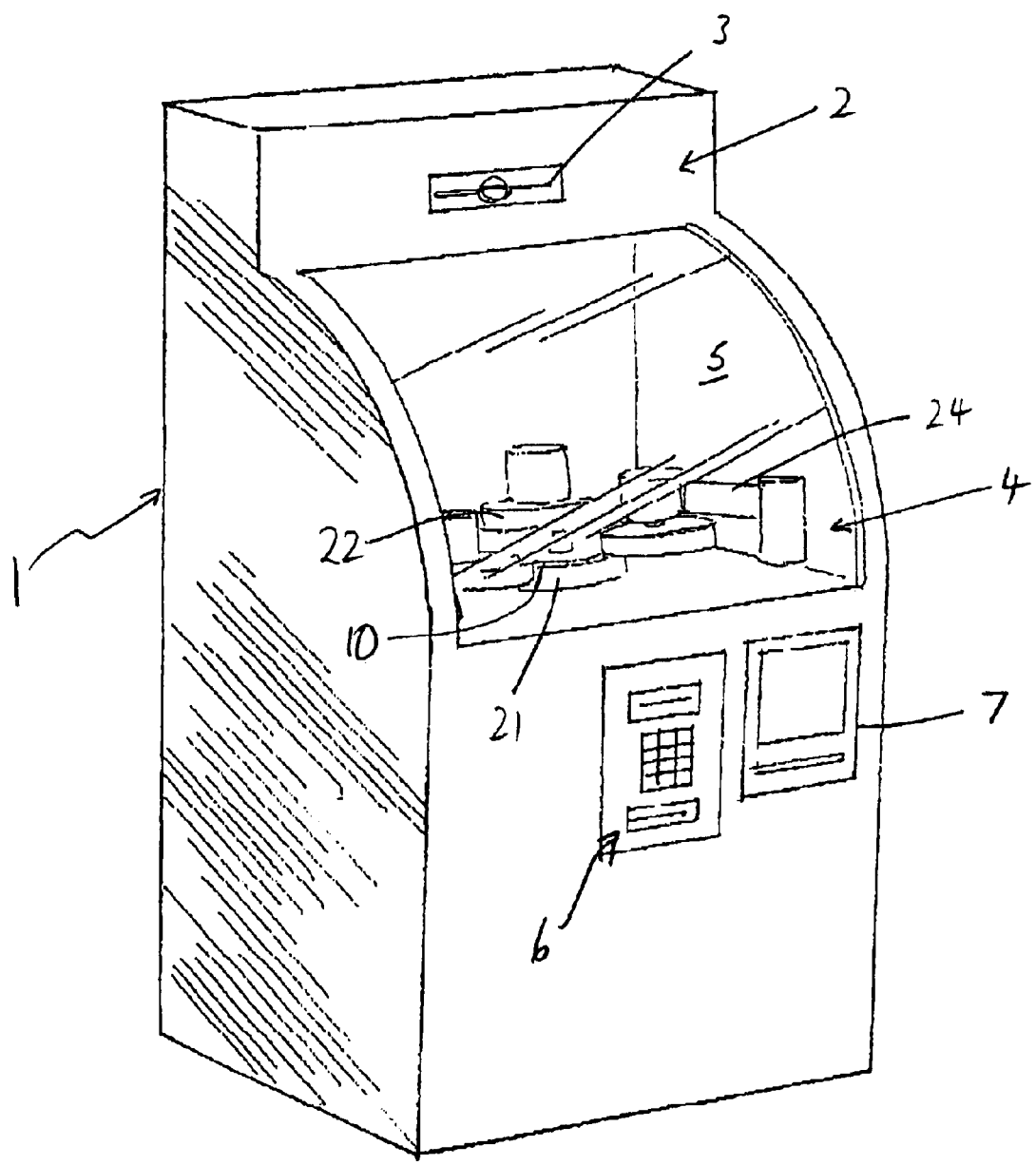
FIG. 1 is a schematic perspective view of the disk restoration service vending machine.

As shown in FIG. 1, The disk restoration service vending machine comprises a console type cabinet 1 housing a disk inspection station 2 (FIG. 2) with a disk insertion slot 3, aligned above a disk restoring station 4 (FIG. 3) exposed behind a waist high glass window 5 for viewing a disk polishing operation and, a user interface comprising a card/cash input area with a display/instruction panel 6 immediately below the window 5 and adjacent a disk jewel case/disk protector vending area 7.

Figure 2:
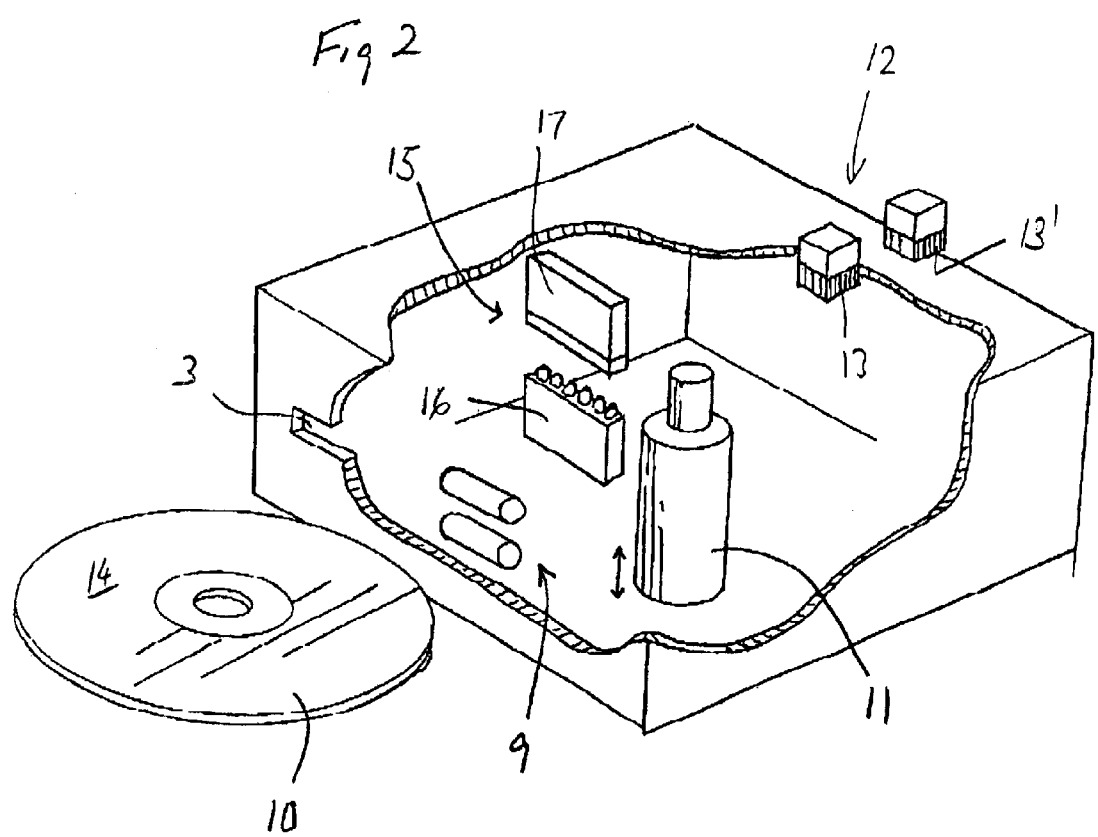
FIG. 2 is a schematic exploded perspective view of a disk inspection station of the vending machine.
Figure 3:
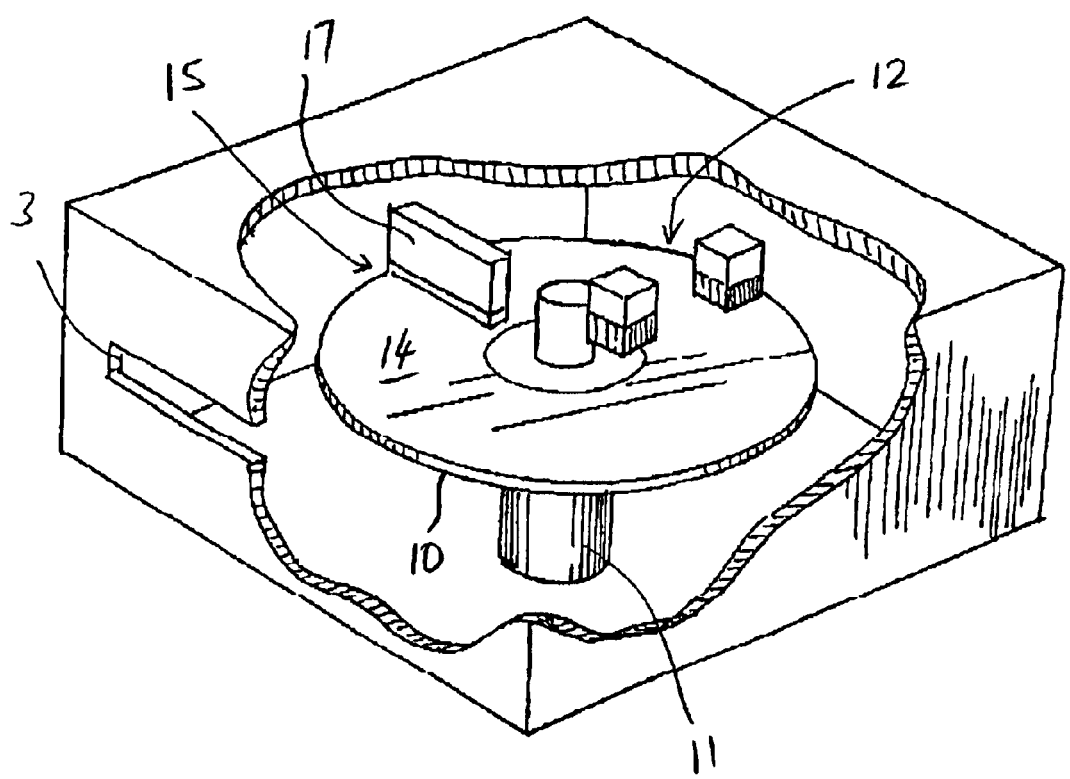
FIG. 3 is a schematic perspective view of the inspection station during a detection step of a disk.
Figure 4:
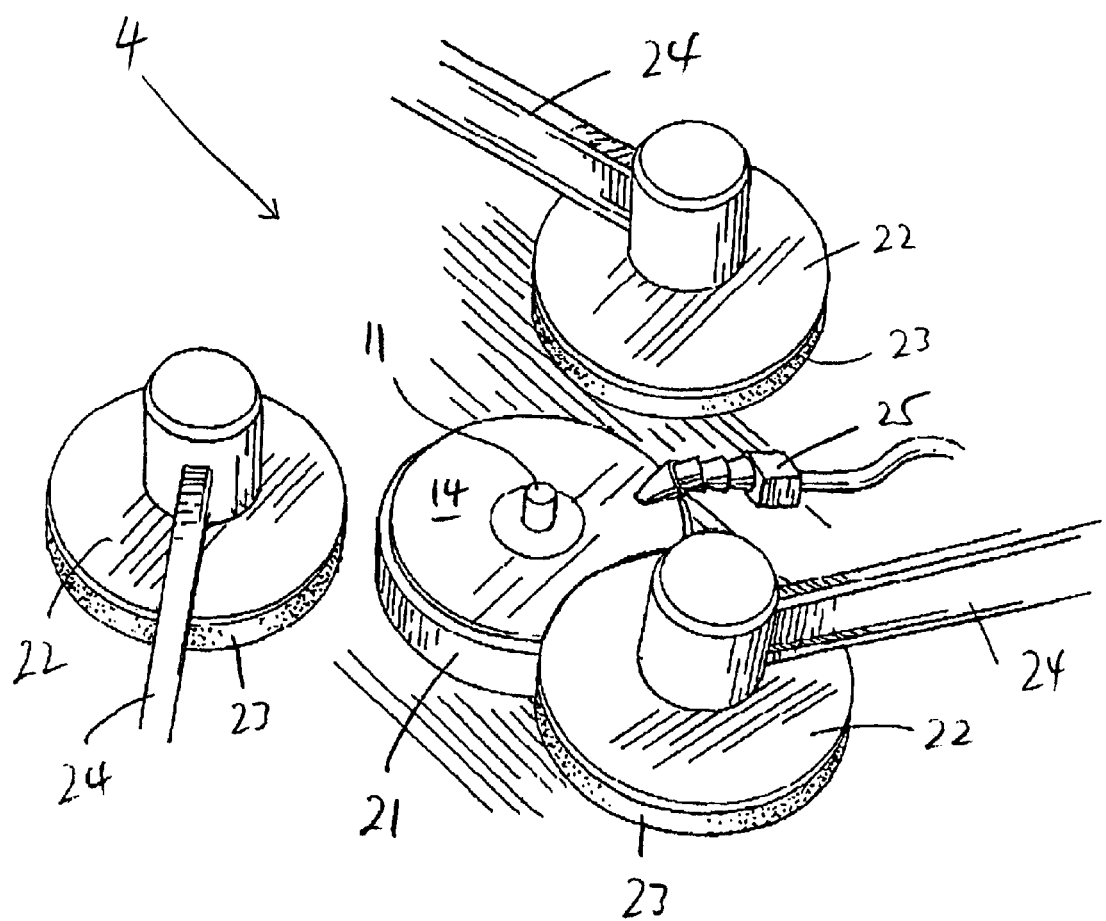
FIG. 4 is a schematic fragmentary perspective view of a disk restoring station according to a first embodiment, during a disk polishing step.

As shown in FIG. 2 and 3, the disk inspection station comprises a roller nip 9 aligned with the disk insertion slot 3, for transferring a disk 10 to a shouldered disk rotating spindle 11, a photo reflective sensor device 12 with an emitter 13 and receiver 13 arranged to receive emitted light reflected by the reflective surface 14 of the disk polycarbonate layer; and, a disk scanning device 15 comprising a lower LED array 16 aligned with an upper sensor array 17 of a CCD-type.

The disk rotating spindle 11 is mounted for vertical movement, by a suitable mechanism such as a simple piston/cylinder lift, toothed belt, jackscrew or other gear mechanism, to convey the disk between the disk inspection station 2 and the disk restoring station 4. The lower LED array is mounted on an arm (not shown) for lateral pivotal movement away from the underside of the disk to provide clearance for the vertical downward movement of the disk to the disk restoring station.

The disk restoring station 4 comprises a high speed polishing turntable 21 receiving the spindle 11 coaxially as a hub and three polishing wheels 22 having rotary polishing heads 23 of successively finer grade abrasive carried by transverse arms 24 successively pivotable over the turntable into polishing engagement with a disk, when lowered by the spindle onto the turntable.

In a simpler version, only one polishing wheel is provided for use with separate wet or dry polishing compounds (grit) of different grades The polishing wheels are rotated about parallel axis by individual electric motors in respective polishing heads or, alternatively, linked to a common drive.

The spindle is linked to the turntable for driving/driven engagement therewith (e.g. by splines provided at a suitable location on the spindle shaft or a ratchet mechanism) at the polishing station. Alternatively, a separate individual drive mechanism is provided for each.

A vacuum nozzle 25 for dust removal is mounted to extend over the disk surface, at least during the polishing process.

A conventional dust guard covers the insertion slot and excludes light to facilitate detection of a perforation in the reflective layer of the disk caused, for example, by a severe scratch. A floor of the inspection compartment includes a trap door type light shutter in light sealing engagement with the shaft of the spindle (effectively forming a bottom wall of the inspection compartment to provide a light proof chamber) and openable to permit lowering of the disk into the polishing chamber.

The entire disk handling and polishing process is controlled by operating circuitry controlled by a microprocessor responding to to operating status signals received from the devices at each station.

To operate the apparatus, a user inserts a disk, label side down through the insertion slot where it is conveyed by the roller nips to the inspection compartment. The machine checks for proper orientation and ejects the disk if label side is uppermost displaying a status message on the panel 6. Alternatively, a well known disk turning mechanism similar to those found in many jukeboxes can be employed.

The machine scans the disk to determine reparability. The imaging array is a CCD-type machine vision system that differentiates between the clear inner ring(s) in some manufactured disks and actual scratches in the recorded area of the disk. Alternatively, an array of photo detectors is used. In this compartment, the lower LED array illuminates the label side of the disk while the upper sensor(s) scans the disk for scratches in the reflective layer under the label.

If light is detected, the scratch has completely punctured the reflective layer, making the disk irreparable. In this case, the machine will eject the disk and display a message informing the customer that the disk is not reparable.

If light is not detected, the disk is reparable and the machine will display a request for payment.

If payment is not received, the disk is ejected. If payment is received, the LED array is moved away from the detection position under the disk and the spindle operated to lower the disk to the polishing turntable. The polishing spindle is raised to engage the disk and then lower the disk into a dust-evacuated polishing chamber. Alternatively, the CD is loaded directly onto the polishing spindle which is at the same level as the CD, and then both are lowered into the polishing chamber.

In another version, robotic arms utilizing suction pick-up devices, linear transfer platforms or similar devices are provided to move the disk mechanically.

The polishing table rotates the CD at high speed (for example, 1800 rpm) and resurfacing process started. First polished with a coarse polishing wheel, the CD is then polished with successively finer wheels which are sequentially swung over and then back, away from the disk.

The panel 6 displays a status message during each phase that explains the operation in process. This adds an entertainment aspect to the machine. At the end of the polishing process, the transverse arms withdraw all polishing wheels clear of the turntable and the spindle is raised carrying the disk back into the inspection chamber into engagement with the nips of the transfer mechanism which are then closed to grip the edge of the disk, the spindle is lowered releasing the disk and the roller nip operated to eject the repaired disk through the insertion slot to the customer.

Figure 5:
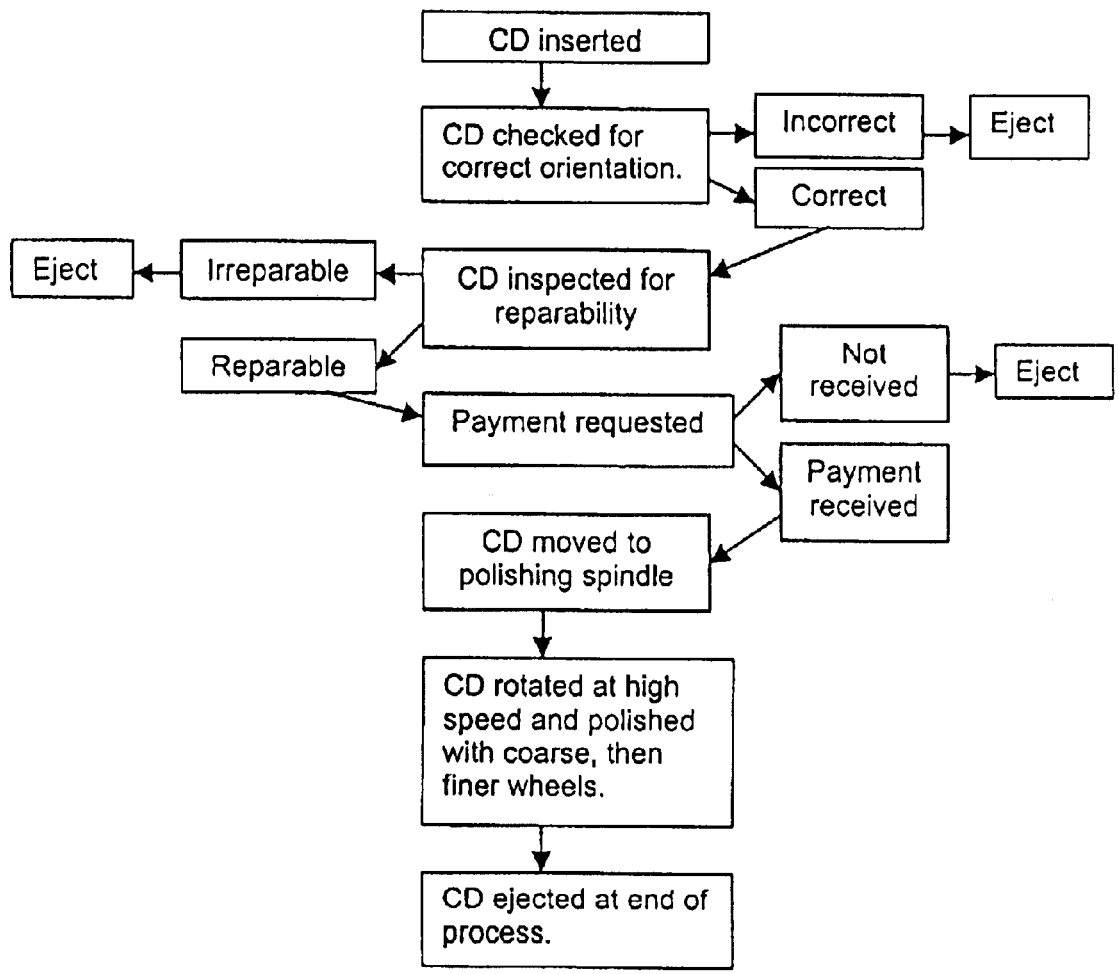
FIG. 5 is a flow diagram illustrating the main operational steps of the first embodiment.

Main steps of the process are indicated in the flow diagram of FIG. 5.

Alternatively, a conventional disk handling mechanism similar to that used in jukeboxes or CD players may be employed to transfer the disk from the turntable to an outlet and to transfer the disk to the spindle in the inspection compartment.

The total restoration time per disk is estimated at 3 minutes.

The machine is built in modular fashion so that components are easily repaired and expendables are quickly replaced in the field.

The machine may be equipped to issue a club card (a debit card) that will allow the customer to prepay for multiple disk restorations as well as providing membership benefits such as discounts and special offers.

The viewing area provided by the window adds an entertainment aspect to the machine.

The service vending machine may be placed in retail service locations such as car washes and laundromats, retail stores including music, game and software stores as well as business to business (at a reduced fee) rental stores such as video, games and music.

In the embodiment described above, the rotary abrasive polishing wheels are in direct contact with the disk surface so that the abrasive grit on the face of the polishing wheels slowly wears away, causing them to wear down. This may not be optimal for a self-service vending machine as polishing wheel faces must be replaced often, increasing maintenance cost and down time.

The second embodiment avoids the above disadvantage as the polishing heads/wheel do not come into direct contact with the disk but are used as a slurry delivery system.

Figure 6:
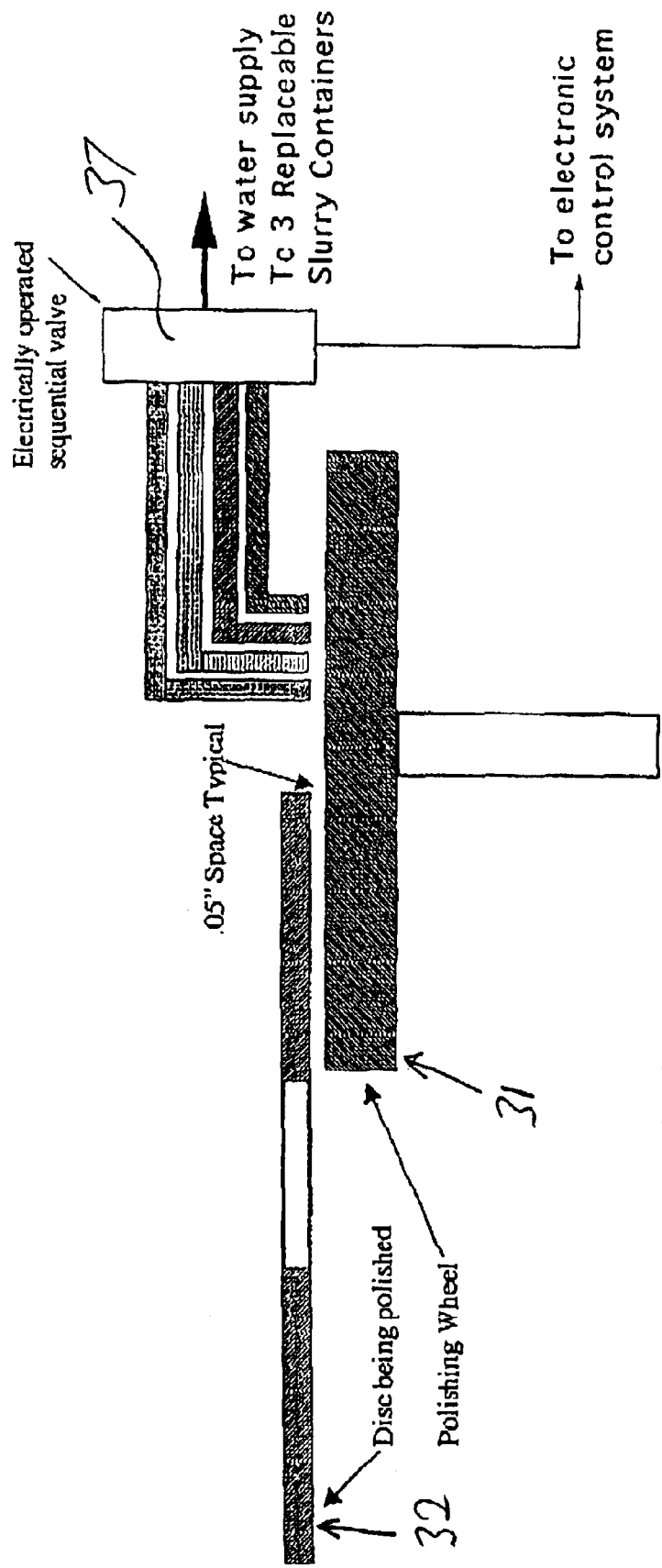
FIG. 6 is a schematic fragmentary perspective view of a disk restoring station according to a second, preferred embodiment, during a disk polishing step.
Figure 7:
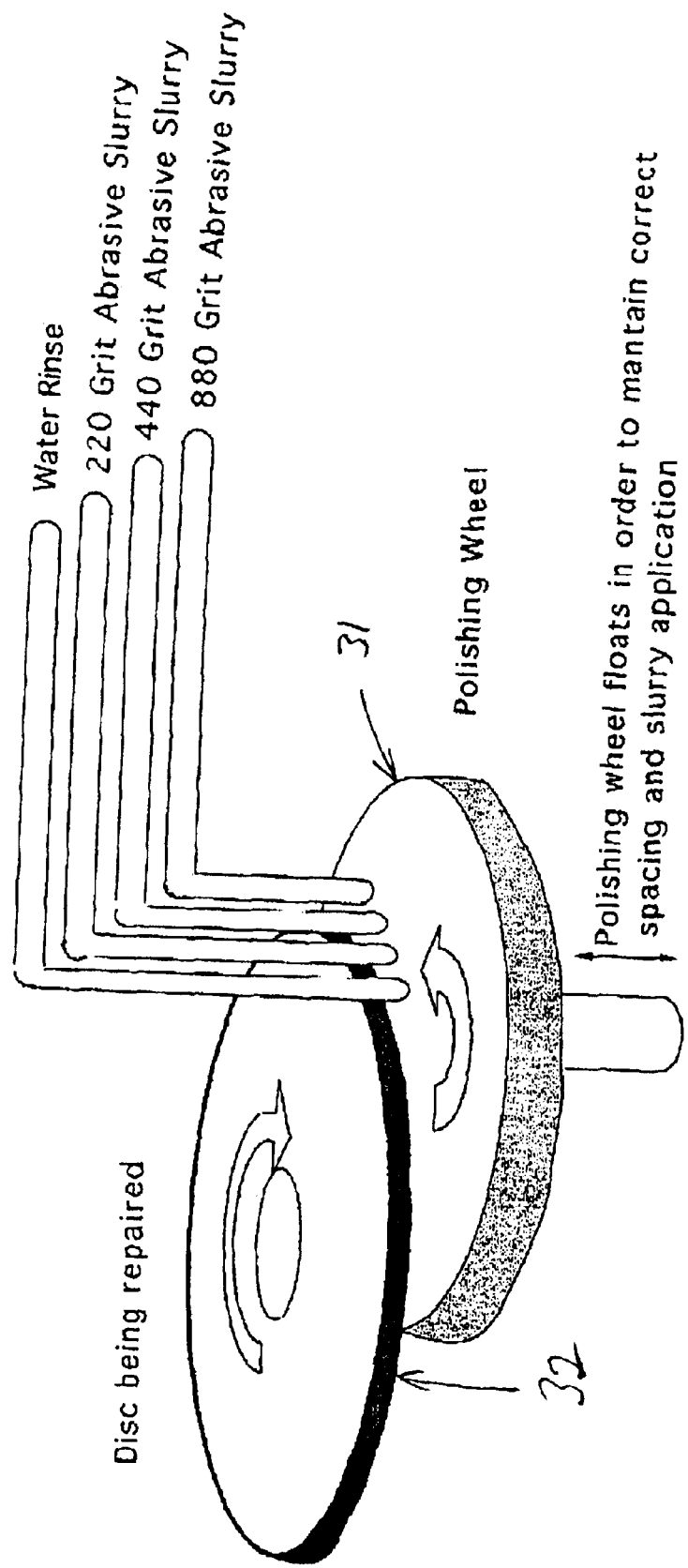
FIG. 7 is a schematic fragmentary cross-sectional view of the restoring station of the second embodiment during a disk polishing step

As shown in FIG. 6 and FIG. 7, an abrasive slurry is sandwiched between the rotating polishing head 31 and the disk surface 32 which are spaced apart from each other by typically 0.05 inches.

The polishing wheel has a resilient mount which permits a degree of vertical float to accommodate flow of the slurry between the polishing head and disk surface. This non-contact polishing system utilizes slurries of different grades of coarseness, starting with a most coarse grade of 220 grit and progressing to grits of finer grades 440, and 880 in subsequent stages. The slurries are delivered from multiple nozzles 34, 35, and 36 positioned to apply the slurry of the desired coarseness onto the disk surface, from respective slurry containers by an electrically operated sequential valve 37. The microprocessor is programmed to operate a pump or pumps sequentially to pump each slurry from its individual container onto the polishing surface of the wheel during rotation which carries the slurry between the opposed surfaces of the disk and polishing wheel. Between each application of slurry, a rinse agent is automatically applied by nozzle 38 to rinse residue of the previous grade of slurry. Alternatively, the system may utilize a single nozzle system with a valve and pump system that directs the correct grade of slurry through the single nozzle during each phase of the process. When polishing is complete the disk is spun dry by continued rotation at high speed.

This approach can also reduce the required number of polishing heads to 1 or 2 heads. The preferred material for the polishing heads is a hard material such as stainless steel. A special finishing head may be utilized for the final optical polishing process. This finishing head may be made of a dense plastic foam material.

Figure 8:
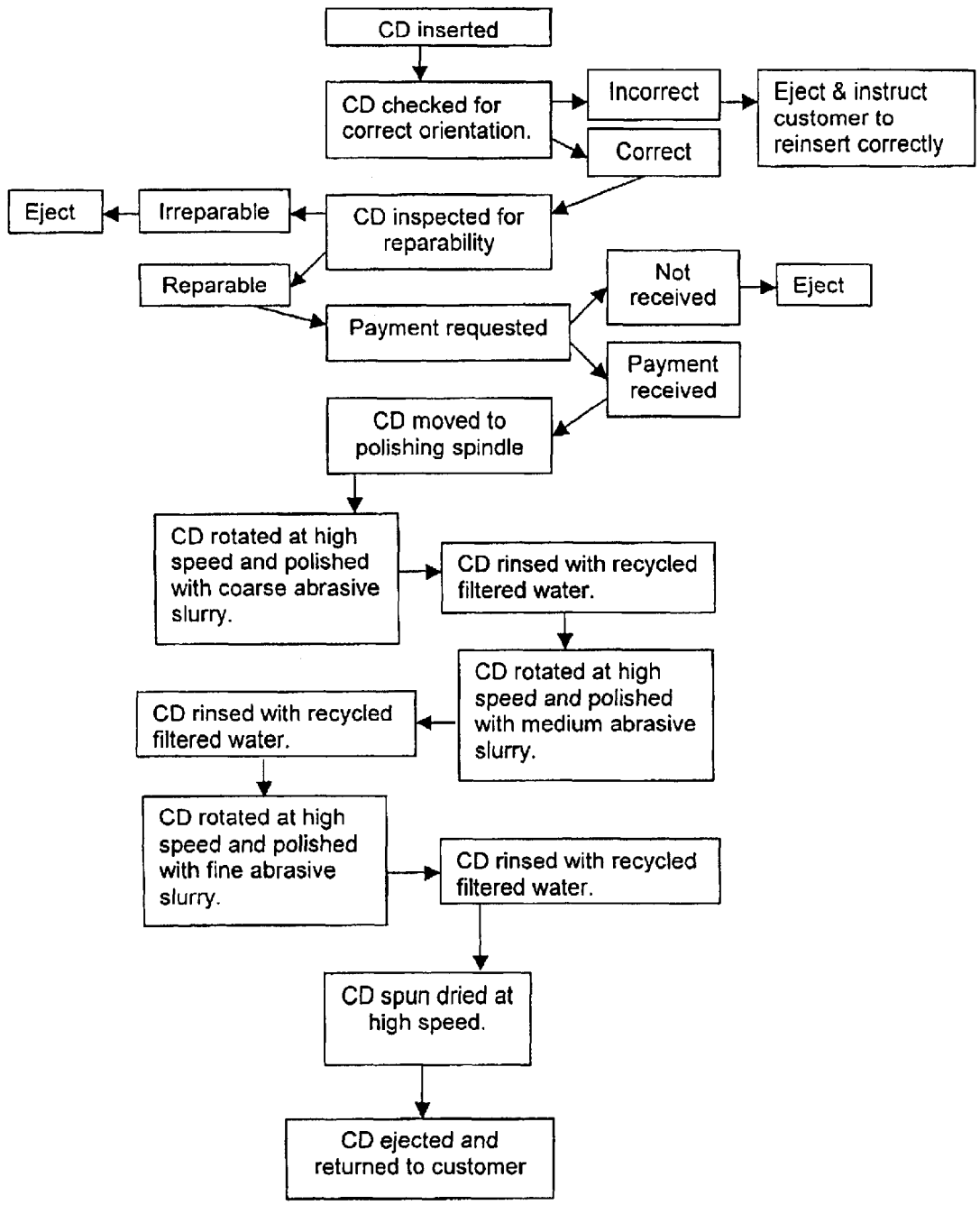
FIG. 8 is a flow diagram illustrating the main operational steps of the second embodiment.

The flow chart of FIG. 8 shows main system steps of the second embodiment.

What is claimed is:

1. Vending apparatus for optical disk restoration comprising:
    a housing:
    means for receiving and guiding an optical disk to be restored from a customer into the housing;
    means for inspecting the disk in the housing to determine whether the disk is correctly positioned for polishing and for providing a signal indicative of a position of the disk;
    means for detecting any perforation in a reflective layer of a correctly positioned disk and providing a signal indicative thereof;
    means for ejecting the disk from the housing in response to a signal by the detecting means that the reflective layer has been perforated;
    a user interface for requesting and receiving payment from a customer in response to a signal by the detecting means that the reflective layer is imperforate and for providing a signal indicating receipt of correct payment;
    means for polishing an exposed light receiving surface of a data carrying protective layer of the disk to ameliorate any scratches therein in response to receipt of a signal from the user interface means indicating correct payment by the payment requesting and receiving means; and,
    means for ejecting a polished disk from the housing to the customer.

2. Vending apparatus according to claim 1 wherein the detecting means and the polishing means are provided at a detecting station and a polishing station, respectively, and means are provided for transferring the disk from the detecting station to the polishing station in response to a signal from the detecting means that the reflective layer is imperforate.

3. Vending apparatus according to claim 2 wherein the guiding means comprises a disk receiving slot formed in an outer wall of the housing and means are provided for feeding a disk received in the slot to the inspecting station.

4. Vending apparatus according to claim 2 wherein the detecting station is located vertically above the polishing station and the transferring means comprises a vertical spindle having an upper end provided with disk supporting means and being movable between an upper disk receiving position at the detecting station and a lower disk polishing position at the polishing station.

5. Vending apparatus according to claim 4 wherein the spindle forms a hub driving a disk supporting turntable at the polishing station.

6. Vending apparatus according to claim 1 wherein the polishing means comprises:
    a polishing wheel having a smooth, hard polishing surface;
    means for supplying, sequentially, a first grade and a second grade of abrasive slurry at a controlled rate to the surface of the polishing wheel, the first grade being coarser than the second grade;

and means maintaining the polishing surface parallel to and spaced apart from the disk surface by an amount sufficient to permit distribution of the abrasive slurry therebetween thereby to polish the disk surface.

7. Vending apparatus according to claim 6 comprising means for supplying a rinse to the surface of the polishing wheel between supplying each grade of abrasive to the polishing wheel and after supply of the second grade.

8. Vending apparatus according to claim 3 wherein the disc is ejected from the housing through the disk receiving slot.

9. Disk restoration service vending apparatus comprising means for inspecting a disk to determine whether it is correctly positioned for polishing and means for detecting any perforation in a reflective layer of the disk to assess repairability and means for polishing an exposed light receiving surface of a data carrying layer of the disk to ameliorate any scratches therein in response to payment by a user.

10. An automated method for restoring optical disks in return for payment by a customer comprising the steps of:

providing a housing;

receiving in the housing a disk to be restored from a customer;

checking that the disk is correctly positioned in the housing for polishing;

one of ejecting the disk from the housing if the disk is incorrectly positioned for polishing and, if correctly positioned, inspecting the disk for any perforation in a reflective layer of the disk;

one of ejecting the disk from the housing if the reflective layer is perforated and, if imperforate, requesting payment from the customer;

one of ejecting the disk from the housing if correct payment is not received and, if correct payment received, restoring the disk by polishing an optical face thereof; and, ejecting the restored disk from the housing.

11. An automated method for restoring optical disks according to claim 10 wherein the optical face is polished using an abrasive slurry.

12. An automated method for restoring optical disks according to claim 11 wherein the abrasive slurry comprises a coarse grade abrasive and a fine grade abrasive applied sequentially.

13. An automated method for restoring optical disks according to claim 10 further comprising a rinsing step after using the abrasive slurry.

14. An automated method for restoring optical disks according to claim 11 further comprising a rinsing step between using each grade of abrasive slurry and after using the fine grade of abrasive slurry.

* * * * *